United States Patent Office 2,746,754
Patented May 22, 1956

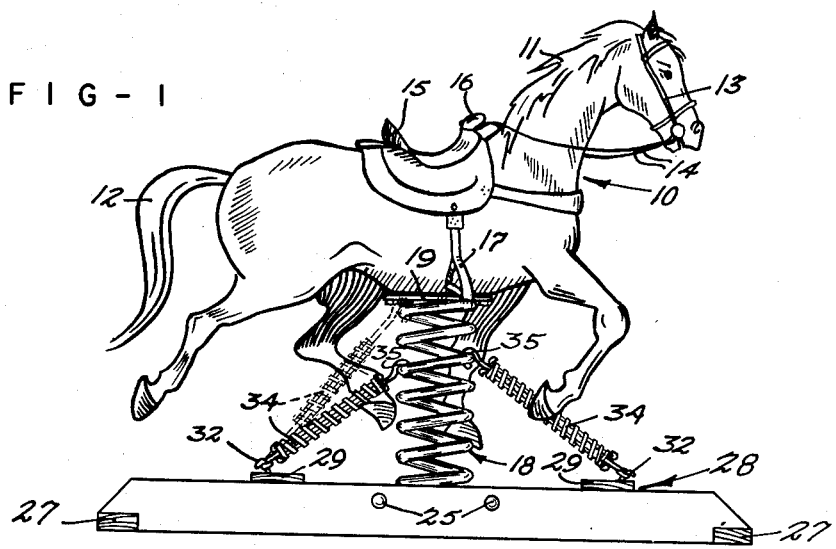
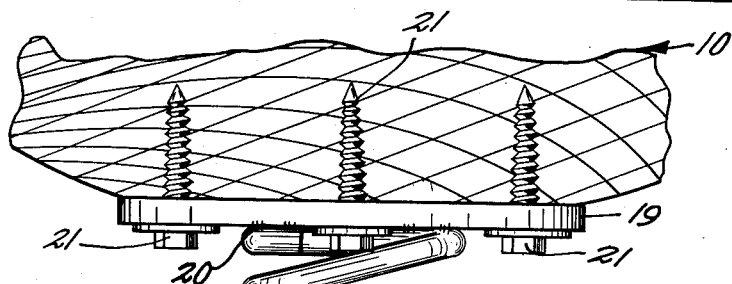
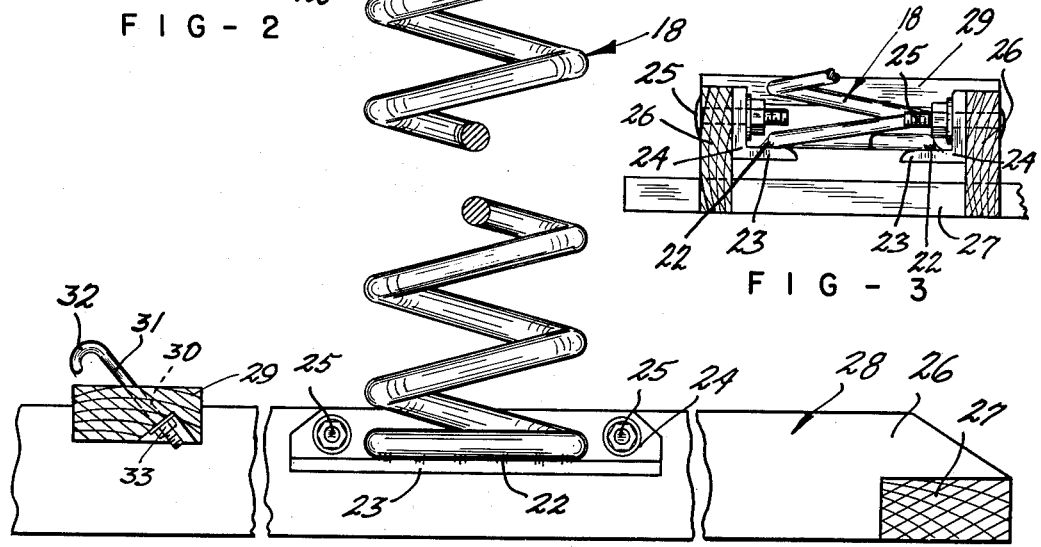

2,746,754
SPRING MOUNTED ROCKING HORSE

Fred W. Martel, Pasco, Wash.

Application March 29, 1954, Serial No. 419,171

1 Claim. (Cl. 272—52)

This invention is a spring mounted rocking horse.

One object of the invention lies in the provision of a rocking horse constructed and arranged so as to more accurately simulate the actions and movements of a living horse.

A still further object of the invention lies in the provision of a spring mounted rocking horse which may be constructed with facility from a minimum number of parts.

Another object of the invention lies in the provision of a spring mounted rocking horse which is inexpensive to manufacture and one that is not liable to get out of working condition.

These and other objects of the invention will become apparent during the course of the following description.

In the accompanying drawing forming a part of this application and in which like numerals are employed to designate like parts, Figure 1 is a side elevation of my improved spring mounted rocking horse;

Figure 2 is a fragmentary vertical longitudinal cross section upon an enlarged scale and having parts broken away for convenience of illustration; and Figure 3 is a fragmentary transverse cross section through the supporting base.

Referring now more particularly to the drawings, I have shown the invention as comprising a simulated horse indicated in general by the numeral 10 and preferably made from laminated or solid wood. The horse is preferably provided with a mane 11 and tail 12 formed from hemp of a coarseness commensurate with that of real horse hair and is provided with the bridle 13 having reins 14. A saddle or other type seat 15 is provided on the back of the horse at its weight center and the saddle has the usual horn 16 and stirrups 17.

The horse 10 is supported at its weight center by means of a convolved compression spring 18 which has a securing plate 19 welded at 20 to its upper end. The securing plate 19 is provided with a plurality of apertures receiving lag screws 21, passed through the plate and threaded into the body of the horse 10 disposing the axis of spring 18 at substantially the weight center of the horse 10. The expansion spring 18 is relatively strong (such as the front coil spring of an automobile) and therefore has considerable resiliency for supporting the horse 10 and an occupant vertically and also for rocking movement.

At its lower end the expansion spring 18 is welded at 22 to the inturned flanges 23 of angle members 24 bolted or otherwise secured at 25 to the inner side faces of longitudinally extending laterally spaced rails 26. At their ends the rails 26 are secured together by means of laterally extending cross bars 27 which extend beyond the width of the spaced rails 26 to support the device against lateral tilting movement and together with the rails form a base 28. At their upper edges and spaced from the longitudinal center of the base 28 are laterally extending anchor bars 29 which are secured in any suitable manner to the base 28.

The anchor bars 29 are provided at their longitudinal centers or midway the width of the base 28 with angular holes 30 through which the shanks 31 of hooks 32 extend and are secured by means of nuts 33 threaded on the ends thereof.

The hooks 32 are adapted to secure the lower ends of tension springs 34 which are provided at their opposed ends with hooks 35 selectively hooked over selected convolutions of the expansion spring 18 to vary the resiliency thereof. Obviously, when the occupant of the rocking horse is heavier it will be necessary to place the hooks 35 over the upper convolutions and when the weight of the occupant is less, the tension springs 34 may be hooked over lower ones of the convolutions or entirely disconnected in the event a very small, light weight child is using the device.

Though I have described the invention as having two tension springs 34 on the transverse median line of the base 26, it is also contemplated employing more than two tension springs, such as four, having their lower ends secured one at each end of the anchor bars 29, thus increasing the resiliency of spring 18 for lateral rocking movement as well as longitudinal rocking movement and vertical springing.

Having thus described my invention, I claim:

A rocking horse comprising a base having a pair of laterally spaced parallel horizontal rails secured at their ends by cross bars mortised therein, lateral anchor bars secured to the rails at their upper edges spaced from the longitudinal center thereof, upwardly disposed hooks carried by the anchor bars at the transverse center line of said base, angle members bolted to the inner faces of said rails midway their lengths, each with one flange disposed inwardly on a like horizontal plane; a relatively strong convolved compression spring welded to the inturned flanges of the angle members and extending upwardly therefrom, a horizontal fastening plate welded on the upper end of said spring; a wooden simulated horse secured to said plate by lag screws passing through apertures in the plate and threading into the body of the horse disposing said spring substantially vertically below the weight center of said horse, a saddle on the horse and disposed with its seat at the vertical weight center of the horse; and tension springs carried at one end by said hooks and having hooks on their opposed ends for hooking over selected convolutions of said compression spring, whereby the resiliency of said compression spring is variable.

References Cited in the file of this patent

UNITED STATES PATENTS

| 543,994   | Lariew   | Aug. 6, 1895  |
| 1,289,382 | Brurock  | Dec. 31, 1918 |
| 2,201,036 | Guerrier | May 14, 1940  |
| 2,452,869 | Richards | Nov. 2, 1948  |
| 2,469,263 | Fisher   | May 3, 1949   |